(12) United States Patent
Kuroda et al.

(10) Patent No.: US 6,782,704 B2
(45) Date of Patent: Aug. 31, 2004

(54) CONTROL APPARATUS FOR AUTOMATICALLY STOPPING AND RESTARTING AN ENGINE

(75) Inventors: Shigetaka Kuroda, Saitama (JP); Hiromitsu Adachi, Saitama (JP); Hideki Watanabe, Saitama (JP); Shinichirou Wakou, Saitama (JP); Hiroshi Ikura, Saitama (JP); Kohei Hanada, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/642,747

(22) Filed: Aug. 19, 2003

(65) Prior Publication Data

US 2004/0055305 A1 Mar. 25, 2004

(30) Foreign Application Priority Data

Aug. 22, 2002 (JP) .................................... 2002-242388

(51) Int. Cl.⁷ ................................................. B60H 1/32
(52) U.S. Cl. ........................... 62/133; 62/236; 62/323.3
(58) Field of Search ......................... 62/133, 236, 243, 62/244, 323.1, 323.3, 323.4, 229, 230

(56) References Cited

U.S. PATENT DOCUMENTS 5,867,996 A    2/1999   Takano et al.
5,934,089 A  * 8/1999   Nakagawa et al. ......... 62/323.1
6,287,081 B1 * 9/2001   Tamegai et al. ............... 62/133
6,351,957 B2 * 3/2002   Hara ............................ 62/236
6,358,180 B1   3/2002   Kuroda et al.
6,688,120 B2 * 2/2004   Aoki et al. .................... 62/244

FOREIGN PATENT DOCUMENTS

| DE | 100 36 793 A 1 | 7/2002 |
| JP | 2000-179734 | 6/2000 |
| JP | 2001-088541 | 4/2001 |
| JP | 2001-213150 | 8/2001 |

\* cited by examiner

Primary Examiner—Harry B. Tanner
(74) Attorney, Agent, or Firm—Arent Fox, PLLC.

(57) ABSTRACT

A control apparatus for automatically stopping and restarting an engine of a vehicle is provided, which is equipped with an engine, a motor, a compressor and an air conditioner. The apparatus has a first section for making a judgment on stopping the engine and a second section for making a judgment on restarting the engine. The apparatus has features that the apparatus provides the air conditioner with a plurality of operational modes selected by a user, and when the vehicle is not in motion with selection of a first mode, the first section permits the engine to stop if a first power that the motor can supply is greater than a second power of the compressor required by the air conditioner, and the second section permits the engine to restart if the second power exceeds the first power.

5 Claims, 5 Drawing Sheets

CONTROL APPARATUS FOR AUTOMATICALLY STOPPING AND RESTARTING AN ENGINE

FIELD OF THE INVENTION

The present invention relates to a control apparatus for automatically stopping and restarting the engine of a vehicle having an air conditioner.

BACKGROUND OF THE INVENTION

In case of a conventional vehicle driven by an engine, air-conditioning, which employs the cold air generated by an engine-driven compressor and the recycled heat of engine cooling water, has been generally provided for the cabin of a vehicle. Recently, a vehicle of idle stop, whose engine is stopped while the vehicle is not in motion, has been developed in order to reduce consumption of fuel. Also in a hybrid vehicle, which is driven by both an engine and a motor, the engine is controlled to stop while the vehicle is not in motion. When such vehicles as a vehicle of idle stop and a hybrid vehicle come to a stop while an air conditioner is in operation, a compressor for air conditioner is not able to continue operation as a result of stopping of an engine. It will consequently make the passengers uncomfortable due to temperature rise in a cabin if it is hot outside or the sun is shining brightly. On the other hand, if it is cold outside, the inconvenience of getting fogged with breathing of the passengers will occur.

Control methods, which inhibit stopping of an engine or drive a compressor by a motor while a vehicle is not in motion depending on the conditions of the outside air temperature and the like, have been developed and reported in such documents as Japanese Published Patent Applications 2000-179734 and 2001-88541.

However, the air conditioning of a conventional vehicle has not been performed so successfully that the cabin can be controlled comfortably in parallel with saving fuel by stopping an engine.

SUMMARY OF THE INVENTION

The present invention provides a control apparatus for automatically stopping and restarting the engine of a vehicle, which enables saving fuel by stopping the engine as much as possible as well as keeping a cabin comfortable.

An object of the present invention is to provide a control apparatus for automatically stopping and restarting an engine of a vehicle, which is equipped with the engine, a motor, a compressor driven by the engine and motor, an air conditioner employing a refrigerating cycle driven by the compressor and a motor control unit that controls the motor so as to drive the compressor at least while the engine is stopped. The apparatus includes a first section for making a judgment on stopping the engine and a second section for making a judgment on restarting the engine. The apparatus has features that the apparatus provides the air conditioner with a plurality of operational modes selected by a user, and when the vehicle is not in motion with selection of a first mode, the first section permits the engine to stop if a first power which the motor can supply is greater than a second power of the compressor required by the air conditioner, and the second section permits the engine to restart if the second power exceeds the first power.

The control apparatus described above permits the engine to stop if the conditions are met. Specifically, when the vehicle is not in motion, the engine is permitted to stop if the available power supplied by the motor is greater than that of compressor required by the air conditioner depending on the cabin temperature and outside air temperature. The permission of stopping the engine is given not only when the vehicle is not in motion and the engine is in operation but when the vehicle is being decelerated. In this case, the permission of stopping the engine is executed when the vehicle has come to a stop.

On the other hand, if the power of compressor required by the air conditioner exceeds that supplied by the motor, the engine is restarted, so that the engine can assist the operation of air conditioner.

In this way, the present invention enables driving of a compressor so as to keep the cabin of a vehicle comfortable while the vehicle is not in motion as well as saving of fuel by stopping an engine as much as possible.

In this connection, it is possible to select two types of approach. One is an approach of one compressor which can be driven by an engine and a motor. The other is an approach of two separate compressors driven by the engine and motor, respectively. If the latter approach is adopted, the coolant may be circulated through a shared refrigerating cycle, by uniting the outlets of respective compressors. Alternatively, it may also be possible for the compressors to have respective refrigerating cycles.

It is not limited to power, by which a comparison is made for judging a permission of stopping an engine. It may be possible to select integration of power with regard to time for a parameter Another object of the present invention is to provide a control apparatus, which has a feature that the second section permits an engine to restart if the remaining capacity of a battery that supplies electricity to a motor falls below a predetermined value.

The apparatus described above is able to restart the engine when the remaining capacity of battery falls below the predetermined value, while a compressor is being driven by the motor while the engine is stopped. In this way, the apparatus allows not only keeping a cabin comfortable by continuing the operation of compressor while the vehicle is not in motion but also maintaining the required remaining capacity of battery.

Still another object of the present invention is to provide a control apparatus, which has a feature that when a vehicle is not in motion with selection of a second mode, the first section permits an engine to stop regardless of the second power of compressor required by an air conditioner.

Yet another object of the present invention is to provide a control apparatus, which has a feature that while an engine is stopped, a motor control unit drives a compressor within the first power that a motor can supply regardless of the second power of compressor required by an air conditioner.

The apparatus described above allows a case, where the compressor is continuously driven by the motor within the available power supplied by the motor and the engine is permitted to stop regardless of the power of compressor required by the air conditioner while the vehicle is not in motion if the second mode is selected by a user. In this way, the apparatus can not only keep the cabin of vehicle comfortable but also save fuel by stopping the engine as much as possible while the vehicle is not in motion if a user selects the second mode.

DESCRIPTION OF THE PREFERRED EMBODIMENTS

An embodiment of the present invention is now described referring to accompanying drawings.

Figure 1:
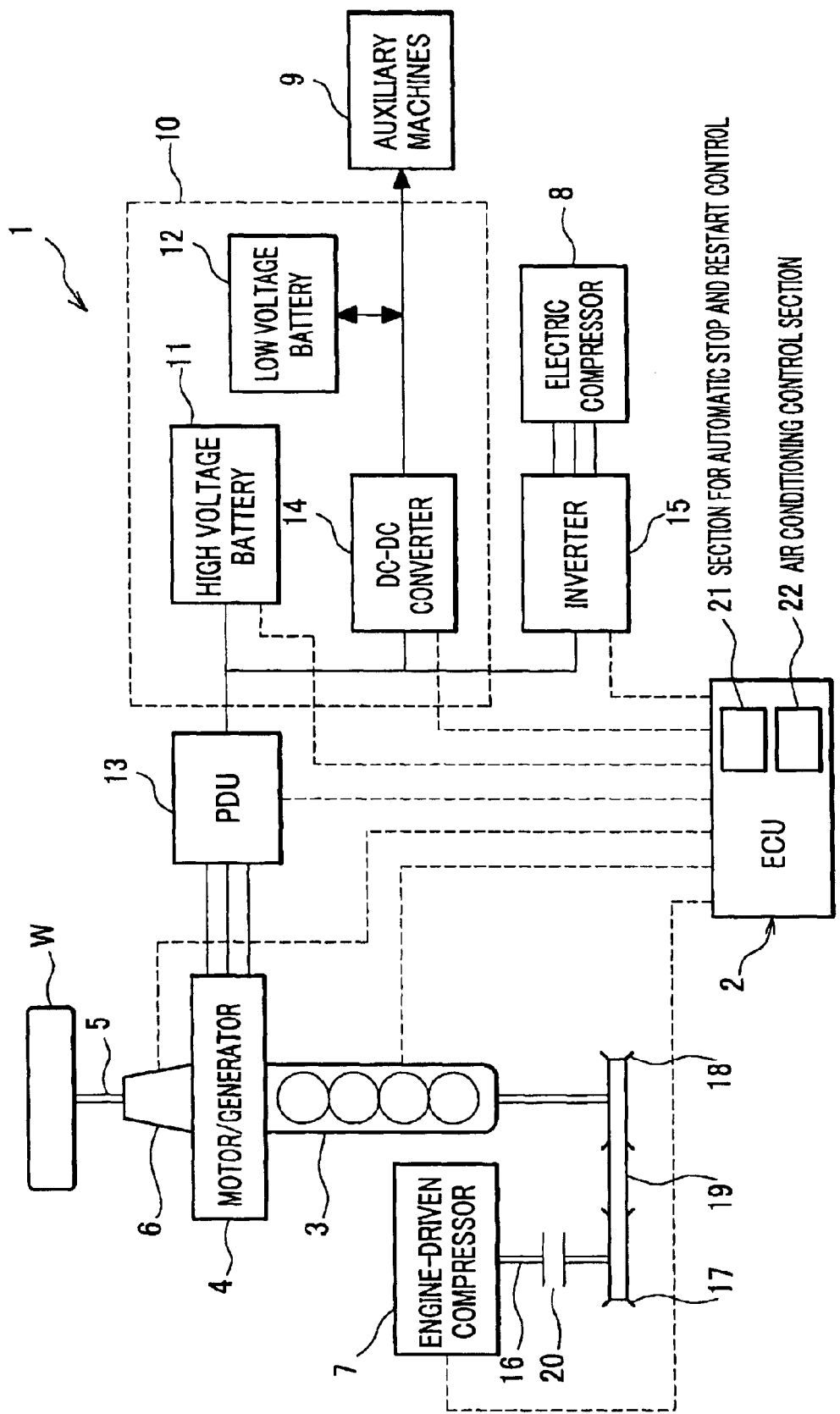
FIG. 1 is a diagram illustrating general structure of a drive system, which includes a control apparatus for automatically stopping and restarting an engine according to the embodiment.

FIG. 1 is a diagram illustrating general structure of a drive system, which includes a control apparatus for automatically stopping and restarting an engine according to the embodiment.

A drive system 1 shown in FIG. 1 has a hybrid construction of direct connection between an engine 3 and a motor/generator 4 (herein after referred to as a motor) with a rotational shaft 5 and an Electrical Control Unit (ECU) 2. The torque of engine 3 and motor 4 is transmitted to a traction wheel W connected to an end of the rotational shaft 5 through a transmission 6. Also the following are connected to the drive system 1: an engine-driven compressor 7 connected to the other end of rotational shaft 5, an electric compressor 8 supplied with electricity by a power storage unit 10 which is electrically connected to the motor 4 through a Power Drive Unit (PDU) 13 and an auxiliary machines 9. The power storage unit 10 includes a high voltage battery 11, a low voltage battery 12 and a DC—DC converter 14.

The drive system 1 of the present embodiment has a feature that the ECU 2 is able to control the engine 3 so that the engine 3 can be automatically stopped and restarted.

The drive system 1 shown in FIG. 1 and components connected thereto are described.

The engine 3 is an internal combustion engine, which uses gasoline as fuel and breathes fuel injected by a fuel injection valve (not shown) and air through an intake valve (not shown), burns the mixture by igniting it with ignition plugs. A combustion gas is discharged through an exhaust valve and an exhaust pipe after undergoing catalytic treatment. The engine 3 is responsible for rotationally driving the traction wheel W, storing electric energy in the power storage unit 10 by rotating the motor 4 and driving the engine-driven compressor 7.

The motor 4 serves as a driving means, being responsible for driving the engine 3 and engine-driven compressor 7, and assisting the engine 3 depending on the conditions thereof. Also the motor 4 serves as a power generator, being responsible for generating regenerative energy during vehicular braking and generating electricity utilizing the power supplied by the engine 3 depending on the conditions of vehicle operation as well as rotating the engine 3 at starting thereof.

PDU 13, which is electrically connected to the motor 4 and includes an inverter (not shown), controls driving and regenerative operation of the motor 4 according to a command provided by ECU 2. The inverter is a Pulse Width Modulation (PWM) inverter, for example, which has a bridge circuit (not shown) made of a plurality of switching elements.

The power storage unit 10 includes the high voltage battery 11 and low voltage battery 12, which is electrically connected to the high voltage battery 11 through the DC—DC converter 14. The high voltage battery 11 is a stacked battery assembly of multiple nickel hydrogen batteries connected in series. DC—DC converter 14 lowers the voltage supplied by PDU 13 or the high voltage battery 11 to an appropriate voltage for the auxiliary machines 9, for example 12 V. For an inverter 15, through which the high voltage battery 11 and electric compressor 8 are electrically connected, a PWM inverter can be adopted.

The engine-driven compressor 7, which provides an air conditioner with energy required for heat exchange, is driven by the rotational shaft 5. A mechanism for transmitting torque includes a pulley 17 which is attached to a rotational axis 16 of engine-driven compressor 7, a pulley 18 which is attached to an end of the rotational shaft 5 of engine 3 and a belt 19 connecting the pulleys 17 and 18. The rotational shaft 16 of engine-driven compressor 7 has an electromagnetic clutch 20, which selectively connects and disconnects the torque transmitted by the pulley 17.

The electric compressor 8 assists the engine-driven compressor 7 when the temperature in a cabin much differs from that required by a passenger and drives a refrigerating cycle instead of the engine-driven compressor 7 when the engine 3 is automatically stopped.

Figure 2:
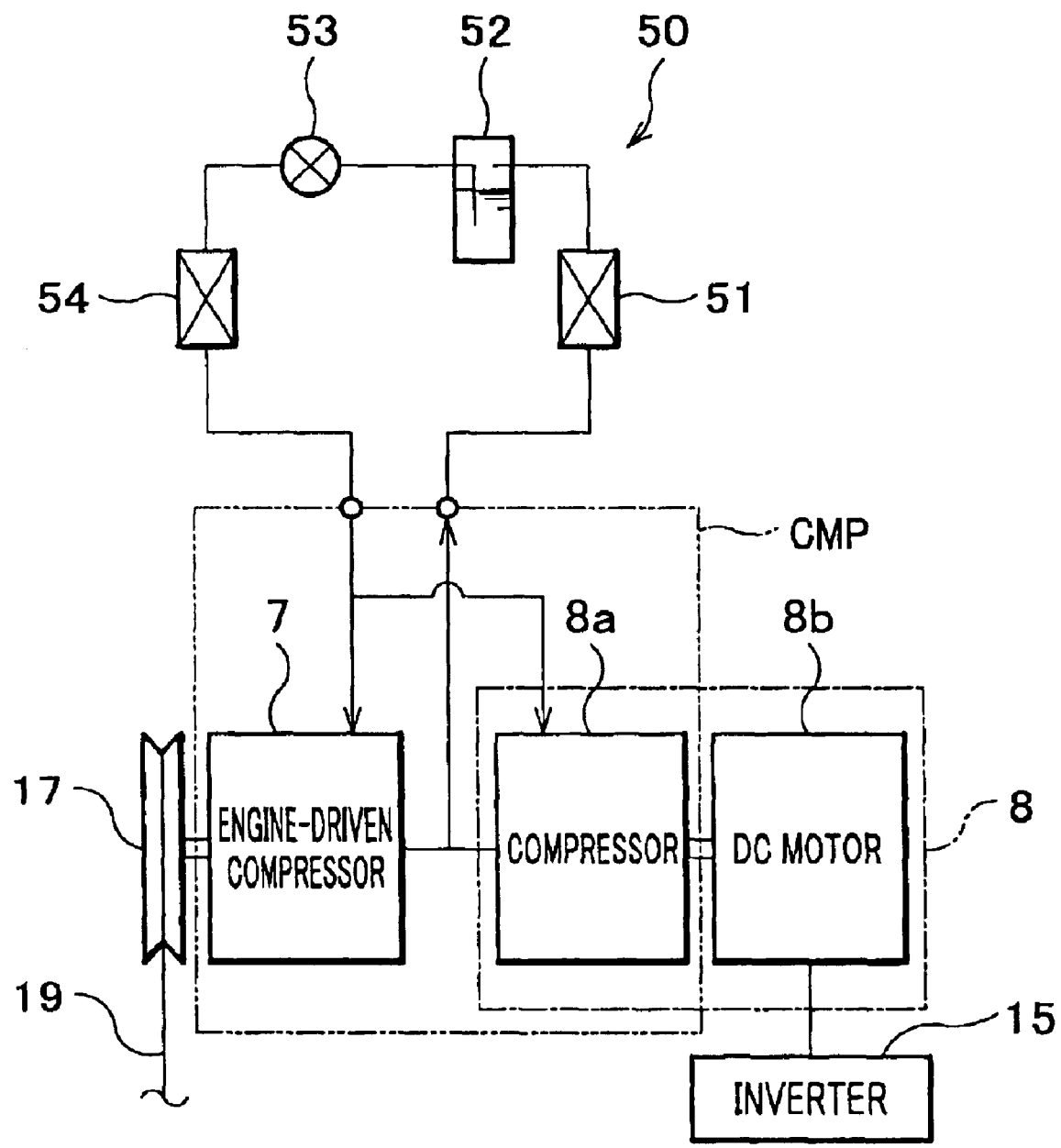
FIG. 2 is a diagram illustrating a part of an air conditioner according to an embodiment of the present invention.

As shown in FIG. 2, the electric compressor 8 has a motor inside referred to in the appended claims, a DC motor 8b.

As shown in FIGS. 1 and 2, a compressor CMP of the present embodiment, which is an example of the compressor referred to in the appended claims, includes the engine-driven compressor 7 and a compressor 8a driven by the DC motor 8b. Since discharge ports of these two compressors are united, both coolants circulate through a refrigerating cycle 50.

The refrigerating cycle 50, which is a known cycle, includes a condenser 51, a receiver 52, a temperature expansion valve 53, an evaporator 54 and the like.

ECU 2, which has electrical and electronic circuits and programs, controls the whole drive system 1 in supplying the engine 3 with fuel and switching the charge/discharge of power storing unit 10. Control associated with making a judgment on automatic stop of the engine 3, which is one of the features of control according to the present embodiment, is executed at a section 21 for automatic stop and restart control. On the other hand, an air conditioning control section 22 controls the engine-driven compressor 7 and electric compressor 8.

Figure 3:
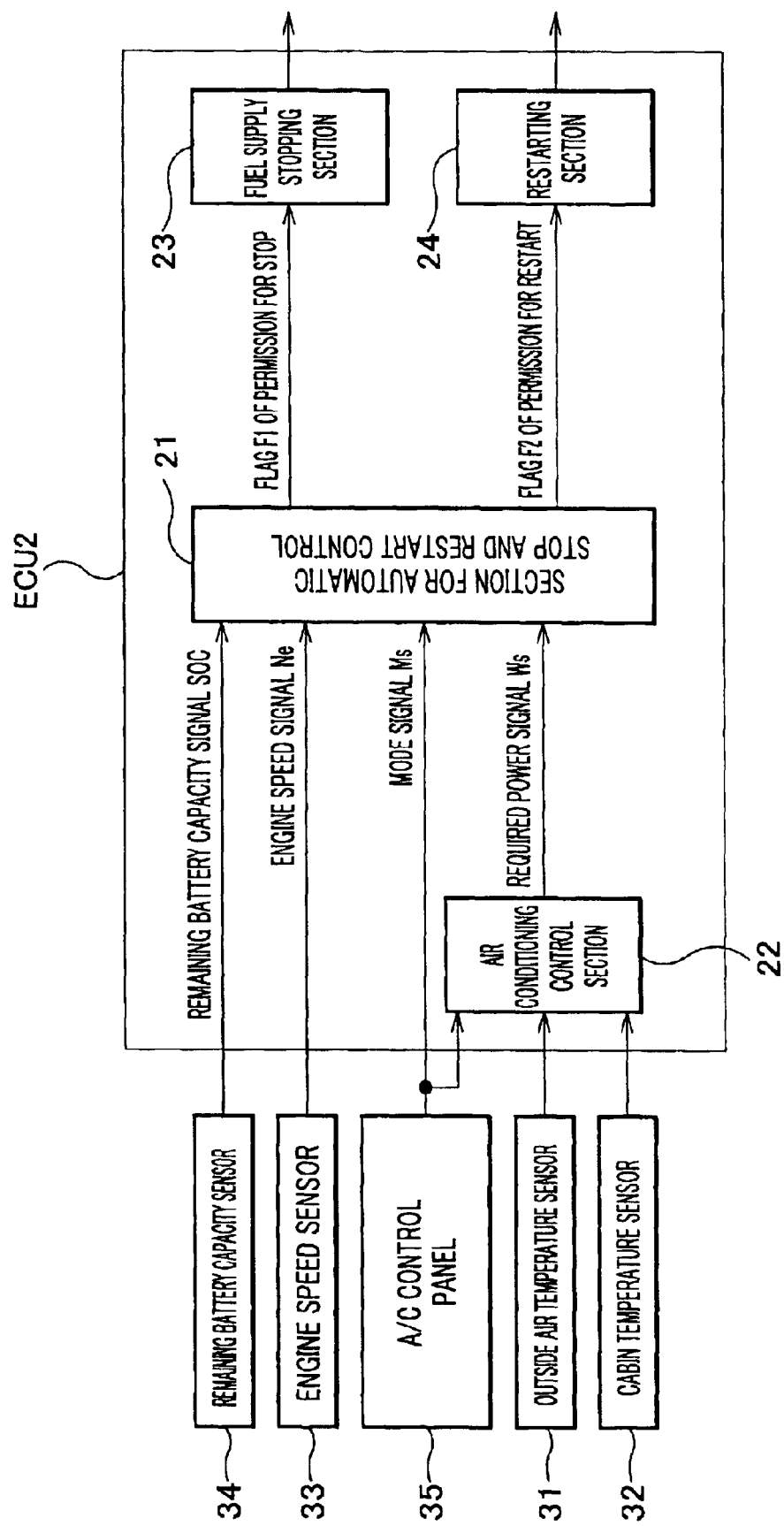
FIG. 3 is a block diagram showing an Electrical Control Unit (ECU) according to an embodiment of the present invention.

As shown in FIG. 3, an outside air temperature sensor 31 and a cabin temperature sensor 32, which detect temperatures for an air conditioner, are connected to ECU 2. Furthermore, an air conditioner (hereinafter referred to as A/C) control panel 35 with switches is connected to ECU 2.

Also an engine speed (Ne) sensor 33, based on which a judgment is made for automatic stop and restart of the engine 3, and a remaining battery capacity sensor 34 for detecting the remaining capacity of power storing unit 10 are connected to ECU 2.

The A/C control panel 35 has a temperature setting switch and a mode selection switch (not shown). The mode selection switch of the present embodiment allows a user to select one of AUTO and ECON modes. The AUTO mode prioritizes the comfortableness of a cabin and the ECON mode saves fuel by stopping an engine as much as possible while a vehicle is not in motion. A mode signal Ms generated as a result of selection of a mode made by a user is delivered to ECU 2. In this connection, the AUTO and ECON modes refer to the first and second modes in the appended claims, respectively.

The air conditioning control section 22 determines the power required for the compressor CMP based on the signals delivered by the outside air temperature sensor 31, cabin temperature sensor 32 and the temperature setting switch of A/C control panel 35, then delivering a required power signal Ws to the section 21 for automatic stop and restart control. The air conditioner referred to in the appended claims includes the air conditioning control section 22, compressor CMP, refrigerating cycle 50, a fan (not shown) and the like, for example. The power required by an air conditioner corresponds to that required by the air conditioning control section 22.

The section 21 for automatic stop and restart control makes a judgment on whether an engine 3 in operation should be automatically stopped or the engine 3 at rest should be automatically restarted based on the required power signal Ws sent by air conditioning control section 22, mode signal Ms sent by A/C control panel 35, engine speed signal Ne sent by engine speed sensor 33 and remaining battery capacity signal SOC sent by remaining battery capacity sensor 34. In this connection, the section 21 for automatic stop and restart control, for example, corresponds to a first section for making a judgment on stopping an engine and a second section for making a judgment on restarting the engine, referred to in the appended claims.

The section 21 gives a permission of automatic stop to an engine 3 if the following conditions in relation to an air conditioner are met. One of the cases where the engine 3 has the permission should satisfy the conditions that an AUTO mode is selected and the available power supplied by the DC motor 8b is greater than that of the compressor CMP required by the air conditioning control section 22. If they are met, the section 21 delivers a flag F1 of permission for stop to a fuel supply stopping section 23. When an ECON mode is selected while a vehicle is not in motion, another case occurs where the section 21 gives the permission and delivers a flag F1 to the fuel supply stopping section 23 regardless of the power required by the air conditioning control section 22.

In this connection, the general conditions required for automatic stop of engine 3 should be met in addition to the requirements described above. As shown in a logic circuit shown in FIG. 4A, all of the following minimum conditions should be satisfied: vehicle speed=0 Km/h; brake switch (SW) ON; water temperature of engine 3 equal to or greater than a predetermined value; shifting position not in Rear (R) or Low (L) range; battery capacity equal to or greater than a predetermined value; throttle opening (TH) OFF. Definitions for these conditions are described below. Break switch ON means that breaking is made by a driver. Water temperature of engine 3 equal to or greater than a predetermined value is required so that the engine 3 can be restarted immediately on request, precluding a possibility of unsuccessful restart due to the low water temperature of engine 3. Shifting position not in Rear (R) or Low (L) range means that the shifting position other than Rear (R) and Low (L) range should be selected at stopping of the engine 3. Battery capacity equal to or greater than a predetermined value means that the remaining capacity of high voltage battery 11 should be equal to or greater than a predetermined value. And TH OFF means that an accelerator pedal should not be depressed.

The section 21 for automatic stop and restart control gives a permission of restart to an engine 3 if the following conditions in relation to the operation of an air conditioner are met. One of the cases where the engine 3 has the permission should satisfy the conditions that an AUTO mode is selected and the power of the compressor CMP required by the air conditioning control section 22 exceeds the available power supplied by the DC motor 8b. If they are met, the section 21 delivers a flag F2 of permission for restart to a restarting section 24. When the remaining battery capacity SOC falls below a predetermined value, for example 25 percent of full charge, another case occurs where the section 21 delivers a flag F2 to the restarting section 24.

In this connection, the general conditions required for automatic restart of engine 3 should be met. As shown in a logic circuit shown in FIG. 4B, all of the following minimum conditions should be satisfied: brake SW OFF; shifting position in Rear (R) or Low (L) range; battery capacity less than or equal to a predetermined value; TH ON. The definition of break SW OFF is that breaking is relieved. And TH ON means that an accelerator pedal is depressed.

When a flag F1 is delivered by the section 21, the fuel supply stopping section 23 terminates supplying fuel to the engine 3, thereby stopping the engine 3.

When a flag F2 is delivered by the section 21, the restarting section 24 drives the motor 4 through PDU 13 and restarts fuel supply and ignition so that the engine 3 can be restarted.

Figure 5:
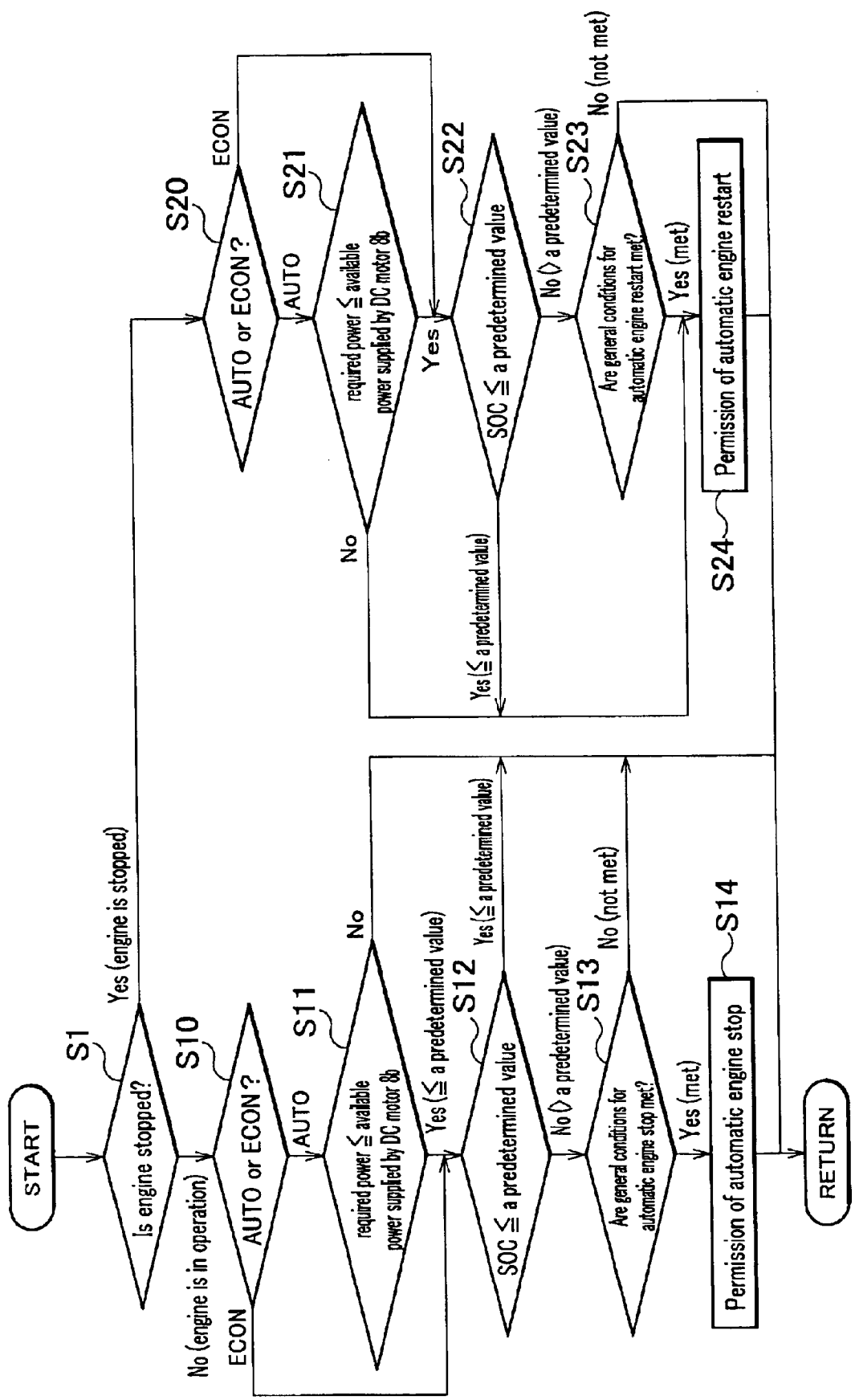
FIG. 5 is a flow chart showing an example of steps executed at a section for automatic stop and restart control.

The flow executed at a section 21 for automatic stop and restart control is now described referring to a flow chart shown in FIG. 5.

The section 21 judges whether an engine 3 is stopped or not (step S1). If the engine 3 is in operation (No), the flow goes into the steps for making a judgment on the permission for stopping the engine 3 shown in the left portion of FIG. 5. The section 21 judges which mode is selected, an AUTO or ECON mode based on a mode signal Ms (step S10). If an AUTO mode is selected, the section 21 judges if the required power of a compressor CMP is less than or equal to the available power supplied by a DC motor 8b based on a required power signal Ws (step S11). If the required power exceeds the available power, the flow is terminated without giving permission for automatic stop to the engine 3. If the required power is less than or equal to the available power, the section 21 judges whether or not a remaining battery capacity signal SOC is less than or equal to a predetermined value, for example 25 percent of full charge (step S12).

On the other hand, if an ECON mode is selected at the step S10, the flow proceeds to the step S12 where the section 21 makes a judgment on permission for automatic stop of the engine 3 regardless of the required power, skipping the step S11.

If the remaining battery capacity signal SOC is less than or equal to the predetermined value at the step S12, the flow is terminated without giving permission for automatic stop to the engine 3. This decision is selected in order to preclude a possibility of adversely affecting the system due to excessively low level in the remaining battery capacity SOC resulting from stopping the engine 3.

Figure 4A:
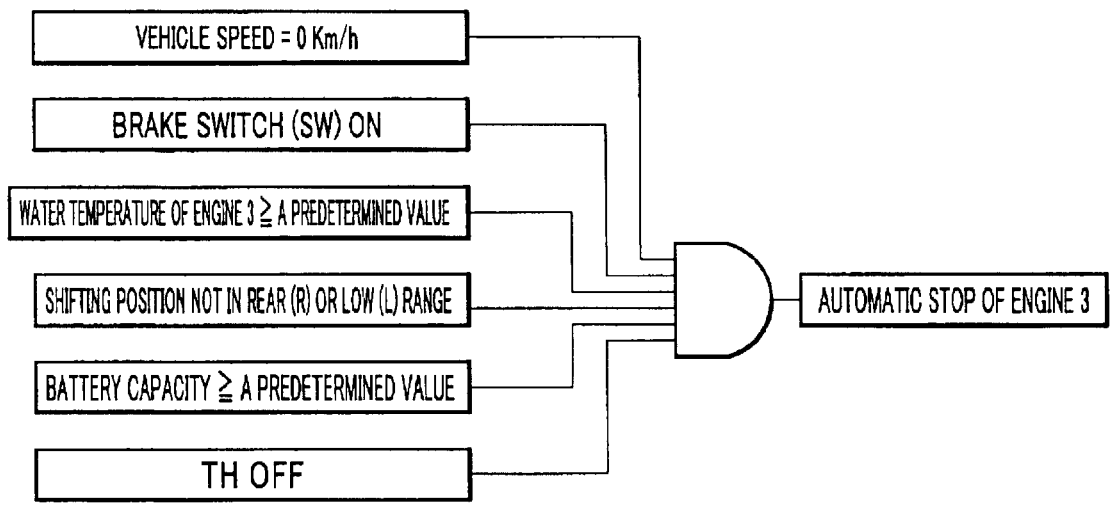
FIG. 4A is a logic circuit showing general conditions required for automatic stop of an engine.

If the remaining battery capacity signal SOC is greater than the predetermined value, the section 21 judges if the general conditions required for automatically stopping the engine 3 shown in FIG. 4A are met (step S13). If they are met, the section 21 gives permission for automatic stop of the engine 3 (step S14), and otherwise the section 21 terminates the flow without giving the permission.

On the other hand, if the section 21 judges an engine 3 is at rest, the flow goes into the steps for making a judgment on the permission for restarting the engine 3 shown in the right portion of FIG. 5. The section 21 judges which mode is selected, an AUTO or ECON mode based on a mode signal Ms (step S20). If an AUTO mode is selected, the section 21 judges if the required power of compressor CMP is less than or equal to the available power supplied by a DC motor 8b based on a required power signal Ws (step S21). If the required power exceeds the available power (No), the section 21 gives permission for restarting the engine 3 (step S24) and terminates the flow. In this case, an engine-driven compressor 7 needs to be driven by the engine 3. If the required power is less than or equal to the available power (Yes), the section 21 judges whether or not a remaining battery capacity signal SOC is less than equal to a predetermined value, for example 25 percent of full charge, or a power storage section 10 is allowed to drive the compressor CMP (step S22).

On the other hand, if an ECON mode is selected at the step S20, the flow proceeds to a step S22, skipping the step S21.

If the remaining battery capacity signal SOC is less than or equal to the predetermined value at the step S22, the section 21 gives permission for restarting the engine 3 (step S24) and terminates the flow. This decision is selected in order to preclude a possibility of adversely affecting the system due to excessively low level in the remaining battery capacity SOC resulting from stopping the engine 3.

Figure 4B:
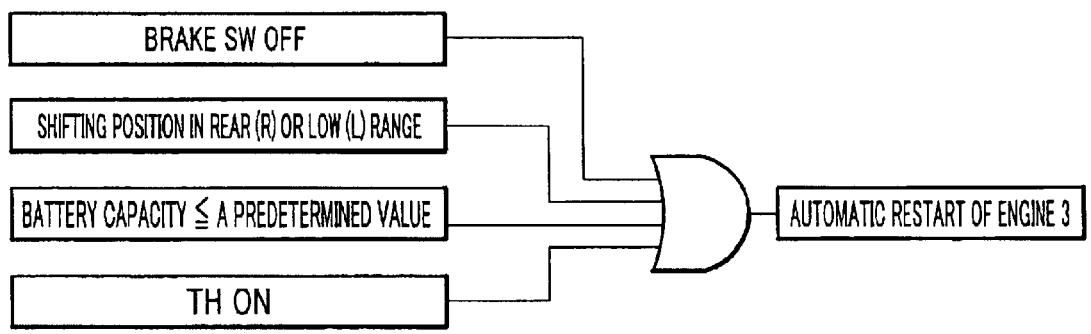
FIG. 4B is a logic circuit showing general conditions required for automatic restart of an engine.

If the remaining battery capacity signal SOC is greater than the predetermined value at the step S22, the section 21 judges if the general conditions required for automatically restarting the engine 3 shown in FIG. 4B are met (step S23). If they are met, the section 21 gives permission for restart to the engine 3 (step S24), and otherwise the section 21 terminates the flow without giving the permission.

These steps are repeated regardless of results, whether permission is given or not.

When the section 21 sets a flag F1 of permission for stop based on decisions made in the flow described above, a fuel supply stopping section 23 stops the engine 3. On the other hand, when the section 21 sets a flag F2 of permission for restart, a restarting section 24 restarts the engine 3.

A control apparatus for automatically stopping and restarting an engine according to the present embodiment can achieve the following advantages. When an AUTO mode is selected while an engine is in operation, the apparatus can drive a compressor CMP depending on the required power thereof, thereby maintaining the cabin of a vehicle comfortable, in parallel with automatically stopping an engine 3. When an ECON mode is selected, the apparatus can drive the compressor CMP within the available power supplied by a DC motor 8b regardless of the power of compressor CMP required by an air conditioner, in parallel with automatically stopping the engine 3 within the limit of a remaining battery capacity SOC. In other words, the apparatus is able to stop the engine 3 automatically as much as possible while the operation of compressor CMP is continued, prioritizing fuel efficiency more than an AUTO mode.

In a case where an AUTO mode is selected while the engine 3 is automatically stopped, the apparatus restarts the engine 3 when the power of compressor CMP required by the air conditioner reaches a predetermined value, thereby achieving optimum air conditioning for a cabin.

It will now be appreciated from the foregoing description that the present invention is not limited to the particularly illustrated embodiment discussed above and may be carried out in various modified forms. For example, it is possible to add other conditions to the general conditions applied to stopping and restarting an engine or replace with them. As the flow shown in FIG. 5 is an example for implementing the present invention, it is possible to select another flow, in which a decision on selection of AUTO or ECON mode is made first and other steps are incorporated. Though description has been made for an embodiment, in which a hybrid vehicle is selected as an example, the apparatus can be applied to a vehicle driven only by an engine, which has idle stop while the vehicle is not in motion.

What is claimed is:

1. A control apparatus for automatically stopping and restarting an engine of a vehicle, which is equipped with the engine, a motor, a compressor driven by the engine and motor, an air conditioner employing a refrigerating cycle driven by the compressor and a motor control unit that controls the motor so as to drive the compressor at least while the engine is stopped, the apparatus comprising:

a first section for making a judgment on stopping the engine; and a second section for making a judgment on restarting the engine, wherein the apparatus provides the air conditioner with a plurality of operational modes selected by a user, and wherein when the vehicle is not in motion with selection of a first mode, the first section permits the engine to stop if a first power that the motor can supply is greater than a second power of the compressor required by the air conditioner and the second section permits the engine to restart if the second power exceeds the first power.

2. The control apparatus according to claim 1, wherein the second section permits the engine to restart if the remaining capacity of a battery that supplies electricity to the motor falls below a predetermined value.

3. The control apparatus according to claim 1, wherein when the vehicle is not in motion with selection of a second mode, the first section permits the engine to stop regardless of the second power.

4. The control apparatus according to claim 3, wherein while the engine is stopped, the motor control unit drives the compressor within the first power regardless of the second power.

5. The control apparatus according to claim 1, wherein the compressor comprises first and second compressors driven by the engine and motor, respectively.

* * * * *